United States Patent [19]

Karasa

[11] Patent Number: 5,200,280
[45] Date of Patent: Apr. 6, 1993

[54] TERMINAL COVER FOR A BATTERY PACK

[75] Inventor: Alvydas P. Karasa, Fallston, Md.

[73] Assignee: Black & Decker Inc., Newark, Del.

[21] Appl. No.: 869,054

[22] Filed: Apr. 14, 1992

Related U.S. Application Data

[63] Continuation of Ser. No. 755,245, Sep. 5, 1991, abandoned.

[51] Int. Cl.⁵ .............................................. H01M 2/10
[52] U.S. Cl. ...................................... 429/65; 429/99; 429/100; 429/159
[58] Field of Search .................... 429/65, 99, 100, 159, 429/122, 123, 163; 206/333, 432, 497

[56] References Cited

U.S. PATENT DOCUMENTS

| | | |
|---|---|---|
| 1,176,467 | 3/1916 | Koretzky . |
| 1,277,147 | 8/1918 | St. Armande . |
| 1,779,767 | 10/1930 | Gillingham . |
| 3,956,019 | 5/1976 | Mabuchi et al. . |
| 4,091,187 | 5/1978 | Kaye . |
| 4,166,532 | 9/1979 | Tsuchida et al. . |
| 4,464,445 | 8/1984 | Matti . |
| 4,965,148 | 10/1990 | Daio . |

FOREIGN PATENT DOCUMENTS

| | | |
|---|---|---|
| 2735293 | 2/1979 | Fed. Rep. of Germany . |
| 2021849 | 12/1979 | United Kingdom . |

*Primary Examiner*—Anthony Skapars
*Attorney, Agent, or Firm*—Dennis A. Dearing; John D. Del Ponti; Charles E. Yocum

[57] ABSTRACT

An enclosure 12 for a disposable battery pack 10 for a cordless power tool consists of a pair of end caps 26, 28 retained on the opposite ends of the pack by a central sleeve 30 of adhesive tape. The end caps are of unitary construction, formed from thin plastic sheet, and include raised terminal covers 32, 34, 36 for shielding exposed terminals 20, 22, 24 from inadvertent outside contact. Each terminal cover has a severable tip 50 which is removed when the pack is to be used, to provide an opening 56 for insertion of a terminal connector 60.

24 Claims, 3 Drawing Sheets

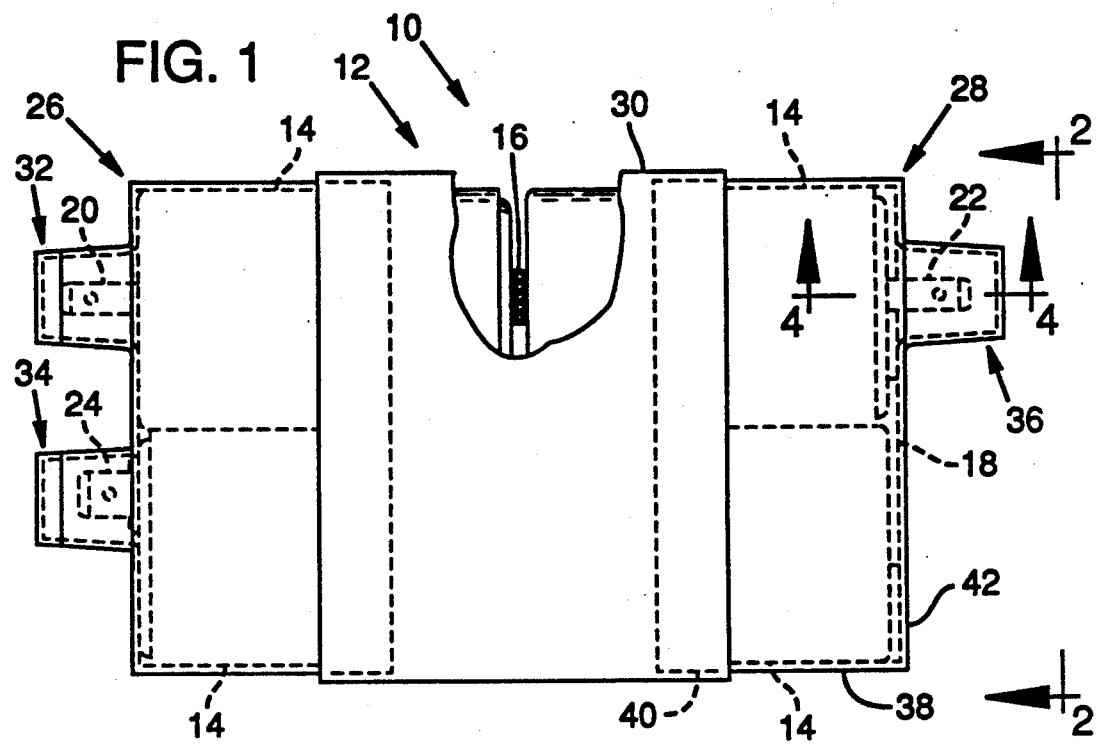

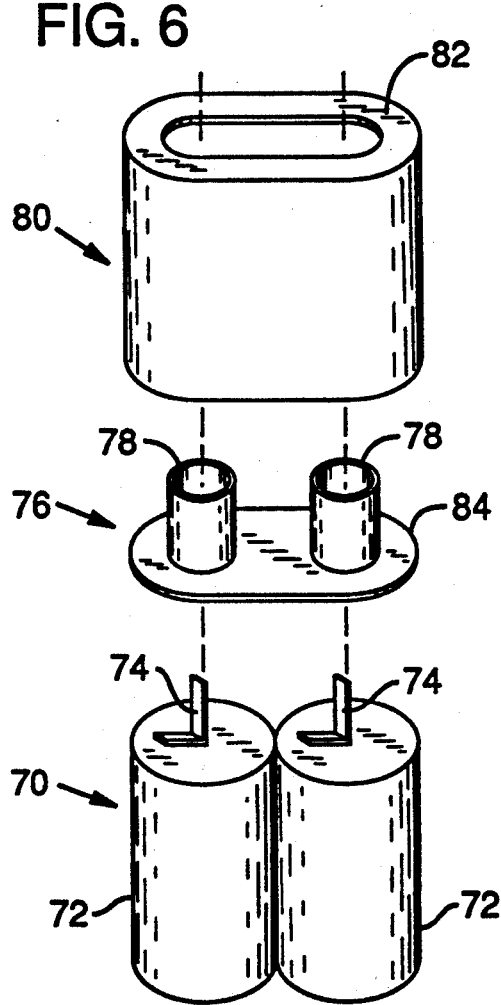
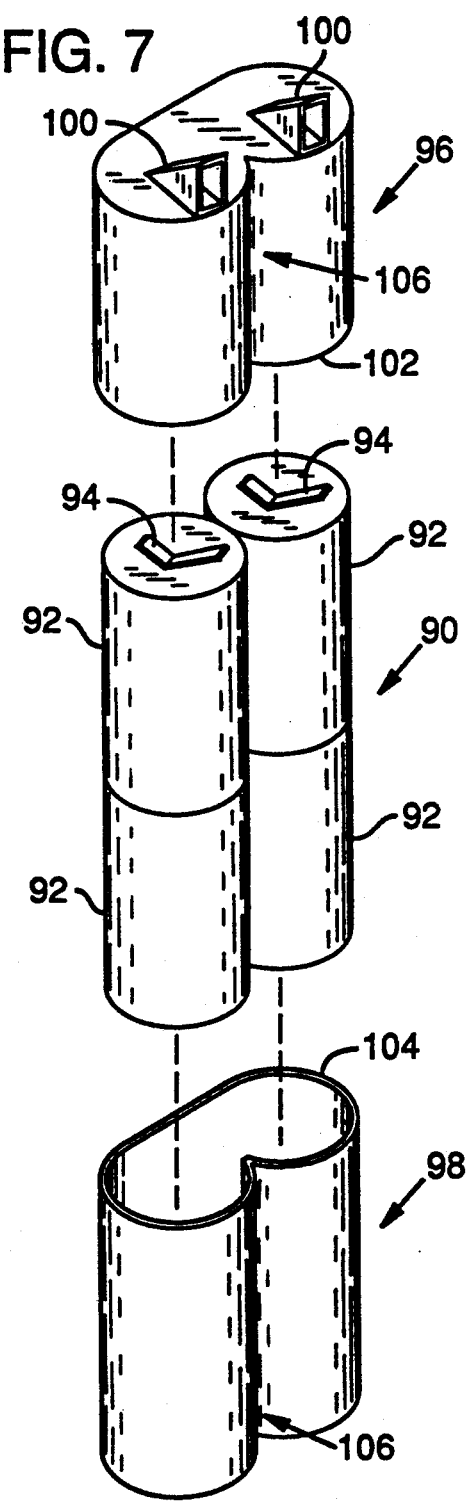

5,200,280

TERMINAL COVER FOR A BATTERY PACK

This application is a continuation of continuation application Ser. No. 07/755,245, filed Sept. 5, 1991, now abandoned.

BACKGROUND OF THE INVENTION

This invention concerns the provision of covers or shields for terminals of battery packs, as used in cordless power tools and the like, for reducing the possibility of unintentional contact, particularly electrically conductive contact, between a terminal and other materials or between two terminals, when the pack is not housed in the tool.

The desirability of avoiding unintentional discharge of any charge present in the cells of the battery pack when handling or disposing of the pack is well understood.

It is also known to create "throw away" power packs or cartridges in which the battery pack cells are enclosed in a housing which includes an end cap or caps of varying degrees of elaboration so that the terminals of the power pack (typically at one end or at opposite ends of the pack) are, at least to some degree, protected. But many such cartridges are expensive to manufacture and use because of their complex structure. Further, and typically, they are not space efficient in that their outside dimensions or overall size may be substantially greater than that required for the cells of the battery pack alone. Also, the cartridge housing may add undesirable weight to the tool or appliance. See for example U.S. Pat. Nos. 4,091,187 Kaye and 3,956,019 Mabuchi.

It is also known to encase the cells of a battery pack in a thin plastic material as for example by the shrink wrap process, at least partly so as to minimize the bulk of the battery pack. See for example U.S. Pat. Nos. 1,277,147 Armande, and 4,166,532 Tsuchida and German patent 2,735,293 Schroder But these disclosures do not suggest provision for maintaining a cover or shielding for the terminals of the pack once it has been prepared for service and/or is about to be discarded.

It is also known to provide simple inexpensive terminal covers, perhaps of cardboard, to shield the terminals of a battery pack when it is shipped or in storage before use. See for example U.S. Pat. Nos. 1,176,467 Koretzky and 1,779,767 Gillingham. But these covers are removed and discarded when the battery pack is prepared for service and hence are not available and in position when it is being handled or when it is discarded.

An incomplete or partial solution to the problem of terminal shielding or covering is offered in the disclosure of British Patent 2,021,849 Ciliberti. The cylindrical side walls of the female terminal of a conventional single 9 volt cell are insulated by a plastic cover using the shrink wrap process.

SUMMARY OF THE INVENTION

Accordingly it is an object of the present invention to provide a terminal cover arrangement for a battery pack which effectively shields the terminals of the pack from random contact and which may remain in place permanently, from a time when the battery pack is first assembled through a time when it may be discarded.

This object may be achieved in the combination of the cell or cells of the battery pack with at least one end cap for the pack, the cap having at least one integral terminal cover, and an element, preferably pliable, for surrounding the cells of the pack and holding the end cap in place.

In a preferred embodiment the end cap may be in the form of a skirted cap, thermo-formed or vacuum formed of a thin material, sized to slip over the end of the battery pack cell assembly and including at least one raised integral, stiff, terminal cover for enshrouding a terminal so that it is substantially entirely shielded from random contact with other material.

Preferably the terminal cover has a specific shape to be compatible with the configuration of the terminal it covers so as to help minimize any increase of volume of the pack over the volume occupied by the unenclosed cells. The terminal cover may be configured so that initially a given terminal is entirely enclosed but the cover may also include a defined tip or other feature which is readily removable or severable to create an access opening of predetermined shape and size so as to facilitate making an electrical connection to the terminal even while the terminal still remains substantially enshrouded and unexposed.

In the preferred embodiment the at least one end cap may be held or retained on the battery pack by a pliable wall member wrapped around and gripping the cell or cells and overlapping the end cap so as to hold it firmly in position. The wall member may, in the preferred embodiment, comprise a length of self-adhesive tape, circumferentially embracing both the end cap and the walls of the cell or cells of the battery pack and, especially in multi-cell packs, contributing to the structural integrity of the pack as well as performing its primary function of retaining the terminal shielding end caps.

It is an advantage of a terminal shielding system according to the invention that the terminal covers may be of sufficient stiffness to protect the covered terminal from mechanical displacement as well as unintentional contact.

A particular advantage of the system of the invention is that the normal "in service" condition of the battery pack and a preferred condition for disposal are the same so that no additional instructions concerning the shielding or covering of terminals need be given with regard to an acceptable disposal procedure.

BRIEF DESCRIPTION OF THE DRAWINGS

FIG. 1 is a side elevation of a battery pack according to the invention, with terminal covers in place.

FIG. 2 is an end elevation of the battery pack of FIG. 1 taken approximately on line 2—2 of FIG. 1.

FIG. 3 is a side elevation of the right hand end cap of the battery pack of FIG 1.

FIG. 6 is an exploded view of an alternative embodiment of the invention in which a plate-like end cap is retained against the end, of the twin cells of a battery pack by a shrink wrap enclosure.

FIG. 7 is an exploded simplified view of a second alternative embodiment in which, in assembly, opposite end caps telescopingly overlap and are bonded at the overlap.

DESCRIPTION OF THE PREFERRED EMBODIMENTS

Figure 4:
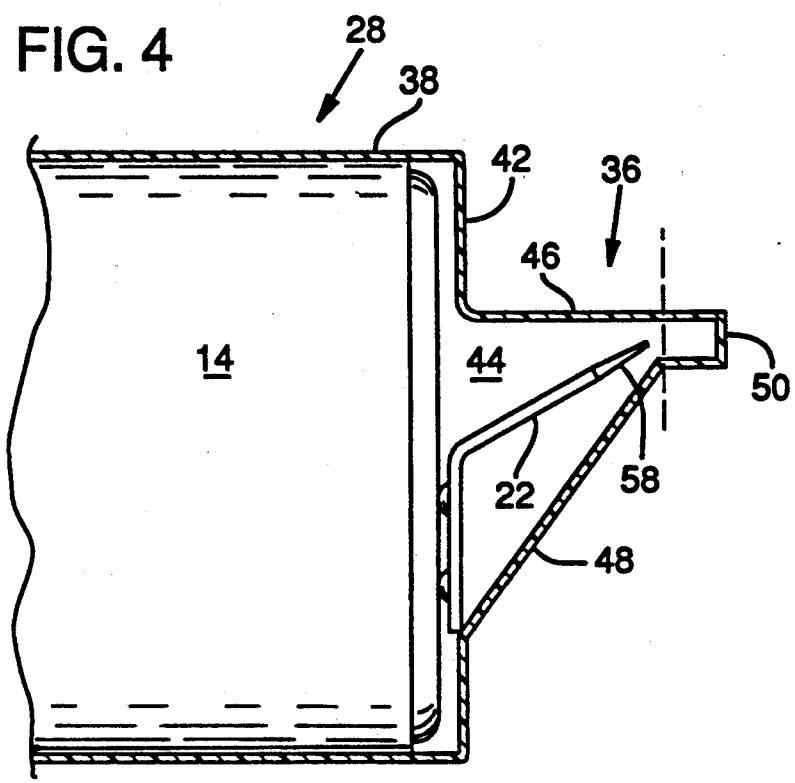
FIG. 4 is a partial enlarged cross sectional view taken approximately on line 4—4 of FIG. 1 and showing a terminal enclosed in a sealed terminal cover.

The exemplary embodiment of the invention illustrated in FIGS. 1-5 is a disposable battery pack 10 for a cordless two speed drill. Except for its enclosure 12 the battery pack is generally conventional and consists of four cells 14 connected in series in abutting pairs by a pair of connections 16 (one shown in FIG. 1) and an end strap 18. External connection is by battery pack terminals 20, 22 and 24. For high speed operation a drill motor (not shown) is connected in series with the four cells 14 by electrical connection to the terminals 20, 24. For low speed operation the motor is connected to terminals 20, 22.

The cells and terminals of the battery pack are completely enclosed by an enclosure 12 which includes a pair of end caps 26, 28 and a centrally disposed adhesive tape sleeve 30 for holding the end caps 26, 28 on the cells 14. End cap 26 has a pair of raised terminal covers 32, 34 while end cap 28 has a single terminal cover 36 but otherwise they are similar in construction and function and only one need be described.

Figure 5:
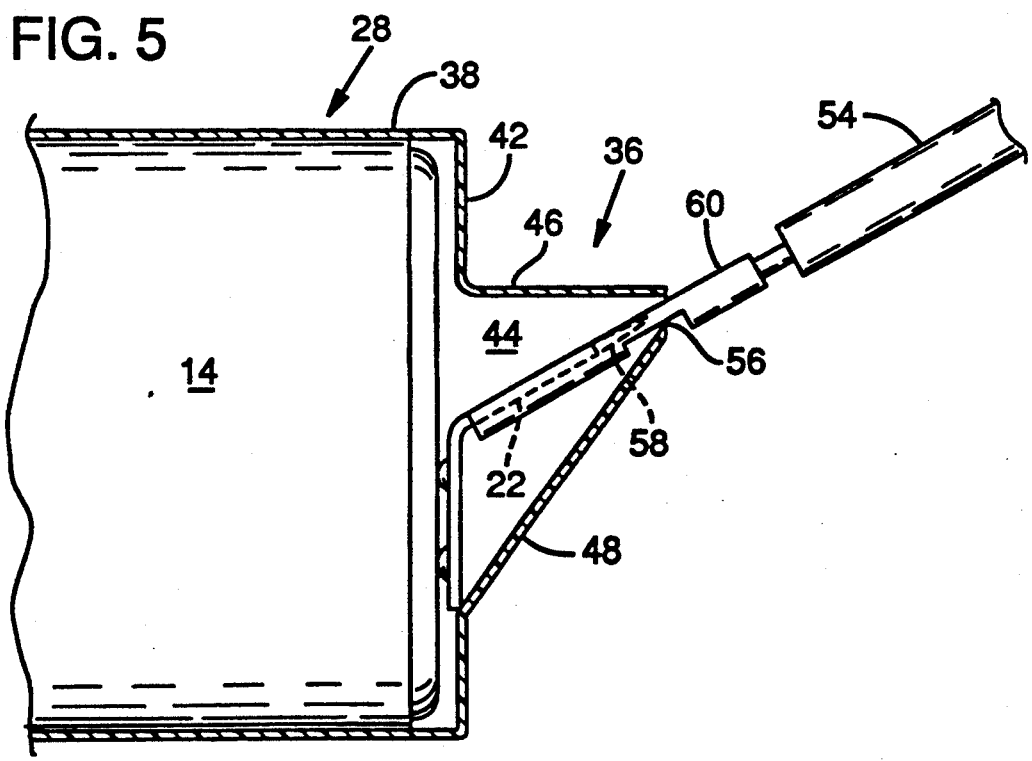
FIG. 5 is a view similar to FIG. 4 but with the tip of the terminal cover removed to permit connection of an external wire lead to the terminal.

End cap 28 is shown in some detail in FIGS. 3-5 and its cross sectional profile is shown in FIG. 2 where it is apparent that the profiled side wall 38 of the end cap conforms closely to the double cylindrical form of the side-by-side cells 14 of the battery pack. The side wall 38 ends in a short flared skirt 40. The terminal cover 36 is integral with a flat transverse end wall 42 which, in assembly, overlays the ends of the cells 14. The terminal cover 36 is generally prismatic in shape and is defined by a pair of opposite triangular side walls 44, an upright end wall 46, and an inclined top wall 48. End wall 46 and top wall 48 converge and their outer edges are contiguous with a short hollow tip 50 which extends the full width of the cover 36.

End caps 26, 28 are preferably made from a thin somewhat resilient material The thinness and resilience minimizes the bulk of the enclosed battery pack and makes feasible the use of battery packs so enclosed in existing battery pack housings, designed for the unenclosed pack End caps 26, 28 may be made for example from thin sheet material by a thermo forming or vacuum forming process. Material thickness is preferably less than 1 mm. Good results have been obtained with end caps 26, 28 thermo-formed from clear polyvinyl chloride sheet, ¼ mm thick before forming. An advantageous result of using this process is that, although there is some thinning of material in the walls of the cap, substantially the full original thickness is retained in the area of the terminal cover 36 where structural strength is desirable Completion of the forming process is facilitated by the "stepped" taper or draft of the side wall 38 and skirt 40 (The slight outward taper of side wall 38 is not shown).

A variety of self-adhesive tape materials may suitably be used to create the end cap retaining sleeve 30. Again thin material is preferred to minimize the bulk of the battery pack. An exemplary material is white polyvinyl chloride adhesive tape of suitable width and ¼ mm thick. The surface of the tape may usefully carry such information as battery pack identification and suggestions for disposal and recycling.

For final assembly of the disposable battery pack 10 the end caps 26, 28 are slipped over the ends of the cells 14 into the positions shown in FIG. 1 The preformed end caps are sized to fit snugly against the walls of the cells but the draft or taper of the skirts and side walls of the end caps (such as skirt 40 and side wall 38 of end cap 28) which is also required for manufacturing helps in guiding the end caps onto the cells. A suitable adhesive tape is wrapped tightly around the pack to form a sleeve 30, overlapping the side walls of the end caps (such as side wall 38 of end cap 28) so as to hold the end caps 26, 28 in position. Preferably two layers of tape are wrapped around the cells and the tape sleeve 30 so created also contributes to the structural integrity of the battery pack 10.

If desired, the tape on one side of the battery pack may be cut centrally and longitudinally and the cut ends pressed down onto the battery cells and both caps to define a "wireway" as indicated at 52 in FIG. 2 to accommodate, for example, a lead from the drill power switch to terminal 22. (See lead 54, shown only in FIG. 5). As an alternative to slitting the tape, and if tape of suitable material is used, the tape may be deformed and stretched down into the bight between the cells to create the wireway.

As now assembled all terminals of the battery pack and particularly terminals 20, 22 and 24 are electrically and mechanically insulated from all outside contact. The terminal covers 32, 34 and 36 compactly and quite closely confine the terminals and, even though thin walled (as described above), their box-like structure is rigid and strong enough to withstand an acceptable level of physical abuse, as may be established in appropriate tests such as drop testing.

In the exemplary embodiment of FIGS. 1-5 the raised prismatic shape of the terminal covers 32, 34, 36 derives from the particular raised or projecting configuration of the exposed terminals 20, 22, 24 of this battery pack. Without departing from the spirit of the invention other shapes of terminal covers may of course be used, to suit other configurations of terminal But, preferably, the form of the terminal cover should always make feasible the provision of a removable or severable tip or other feature, such as the hollow tip 50 of the present embodiment, to establish an opening for providing external access to the shielded terminal for making an electrical connection.

In preparation for putting the battery pack 10 into service the tips of the terminal covers, such as tip 50 of terminal cover 36, are severed by a suitable shearing means so as to create a rectangular opening 56 at the conjunction of walls 46, 48 of the terminal cover and as seen best in FIG. 5. In keeping with the invention, even after the tip 50 of the terminal cover 36 is removed, the terminal 22 remains substantially entirely covered by the terminal cover 36 and even the tip 58 of the terminal 22 remains within the walls of the terminal cover and well away from the opening 56. To complete electrical connection female terminal 60 on lead 54 is inserted through the opening 56 into telescoping engagement with the male terminal 22. In other embodiments the arrangement may of course be reversed with the fixed terminal being the female.

FIG. 6 illustrates, in an exploded view, an example of a second embodiment of the invention. A two cell battery pack 70 comprises a pair of cells 72 each with a generally upright terminal 74. A terminal cover end cap 76 is configured and sized to be placed against the top of the cells 72 so that terminals 74 extend into the open ended terminal covers 78 of the end cap. An enclosure for the battery pack is created by shrink wrapping a thin plastic housing 80 onto the battery pack so that a flange 82 of the shrink wrap housing engages and holds the plate portion 84 of the end plate 76. The open ended terminal covers 78 are significantly deeper than the terminals 74 of the battery pack so that, in assembly, the terminals 74 remain recessed in the covers 78 so as to minimize the possibility of random outside contact of the terminals.

The four cell battery pack illustrated, in exploded view, in FIG. 7 exemplifies a third embodiment of the invention. The four cell pack 90 comprises four cells 92 the upper two of which carry a pair of terminals 94. The enclosure for the battery pack comprises upper and lower thermo-formed or molded sleeves or end caps 96, 98 the upper of which includes a pair of terminal covers 100. In assembly the close fitting sleeves 96, 98 are slipped over the battery pack 90 so that they telescopingly overlap and their ends 102, 104 may be bonded together, ultrasonically for example, at the overlap, to create a permanent enclosure. This bonded joining of ends 102, 104, in effect, completes a sleeve, overlapping the respective end caps 96, 98 so as to retain them on the cells 92. In assembly the terminal covers 100 of the upper cap 96 register with the terminals 94 of the cells and effectively shield them from random outside contact. As shown in FIG. 7, the walls of the caps 96, 98, on at least one of their sides, may partially conform to the cylindrical shape of the cells 92 so as to create a groove 106, usable as a wireway for an electrical lead.

Battery pack enclosures according to the invention, and as in the exemplary combinations described above, substantially entirely enclose the battery pack and, particularly, potentially exposed terminals of the pack during the life cycle of the pack including its disposal phase. The extent of coverage is such that the possibility of inadvertent contact between a terminal and an outside body is much reduced. The configuration of the battery pack for use in operation is also a suitable one for disposal of the battery pack so that no additional instructions need be given or action taken with regard to shielding of terminals when the pack is ready to be disposed of.

A limited number of embodiments has been described but clearly the invention is adaptable to many configurations of cell arrangement, cell number (including a single cell pack) and terminal configuration.

In all embodiments materials used in covering the terminals and retaining those covers on the cells of the battery pack is of such thinness that enclosing the battery pack according to the invention need not substantially increase its bulk. And the simplicity of the enclosures make them very inexpensive to manufacture. Thus enclosures according to the invention may be used without incurring a cost penalty or inconvenience from increasing the bulk of the tool or appliance in which they are used. In many cases existing battery packs may be enclosed in a manner according to the invention and housed in their host tool or appliance without modification of existing housings or receptacles in the tool or appliance. The use of thin and pliable or somewhat resilient materials for the enclosures enhances the potential compatibility of "retrofitted" enclosures to battery packs for use in existing housings or receptacles.

I claim:

1. An enclosure for a battery pack, the pack having opposite first and second ends and including at least one cell and a raised and exposed terminal carried at the first end for providing electrical contact with the at least one cell comprising:

a first end cap for capping the first end of the battery pack and including a raised terminal cover having a plurality of walls for enclosing the terminal so as to render it contactable by an outside element only by penetration of that element within the walls of the terminal cover; and means for surrounding the battery pack and overlappingly engaging the end cap so as to retain the end cap on the first end of the battery pack.

2. The enclosure of claim 1 wherein the first end cap includes a side wall for, in assembly, extending longitudinally over and closely fitting the first end of the battery pack and wherein the means for surrounding the battery pack comprises a band encircling the battery pack and said band provides the overlapping engagement of the end cap.

3. The enclosure of claim 2 wherein the band is made from a pliable material.

4. The enclosure of claim 3 wherein the band is formed from a length of self-adhesive tape.

5. The enclosure of claim 3 wherein the band comprises a sleeve of shrink wrap material.

6. The enclosure of claim 2 and including a second end cap for capping the second end of the battery pack, said second end cap also including a side wall for, in assembly, extending longitudinally over and closely fitting the second end of the battery pack and wherein said band overlappingly engages the second end cap so as to retain it on the second end of the battery pack.

7. The enclosure of claim 1 and including a second end cap for capping the second end of the battery pack and wherein the respective first and second caps each include a side wall for, in assembly, extending longitudinally over and closely fitting the respective ends of the battery pack and wherein, in assembly, the side walls of the respective first and second end caps overlap longitudinally and said means for surrounding the battery pack comprises the bonding together of the overlapping walls of the respective end caps.

8. The enclosure of claim 1 wherein the first end cap is of unitary construction and formed from a single sheet of thin plastic material.

9. The enclosure of claim 8 wherein the plastic material is not more than 1 mm thick before the end cap is formed.

10. The enclosure of claim 1 wherein the terminal cover is closed and the walls of the cover include a severable portion and the cover is configured so that severance of the severable portion establishes a predefined opening in the walls for specific access to the terminal and so that the terminal remains substantially enclosed by the walls.

11. The enclosure of claim 1 wherein the first end cap includes an end wall for transverse juxtaposition with the first end of the battery pack.

12. The enclosure of claim 11 wherein the means for surrounding the battery pack comprises a sleeve of shrink wrap material which, in assembly, extends over the end wall of the first end cap to retain it on the first end of the battery pack.

13. The enclosure of claim 1 wherein the at least one cell comprises a plurality of cells and at least some of the cells are elongated, said cells each having a longitudinal axis, and at least two of said cells are disposed with their longitudinal axes parallel to each other and wherein said means for surrounding the battery pack grippingly engages said cells, tending to hold them in fixed relationship, one with the other.

14. An end cap for use with a battery pack, said pack having opposite first and second ends and including at least one cell and a raised and exposed terminal carried at the first end for providing electrical contact with the at least one cell comprising:
   a thin transverse wall of the end cap for juxtaposing transversely with and capping the first end of the battery pack; and
   a raised terminal cover having a plurality of walls and integral with the transverse wall, for registering with and enclosing the terminal so as to render it contactable by an outside body only by penetration of the body within the walls of the terminal cover.

15. The end cap of claim 14 wherein the terminal cover is closed and the walls of the cover include a severable portion and the cover is configured so that severance of said portion establishes a pre-defined opening in the walls for specific access to the terminal and so that the terminal remains substantially enclosed within the walls.

16. The end cap of claim 14 wherein the end cap includes a side wall for, in assembly, extending longitudinally over and closely fitting the first end of the battery pack, said wall providing engageable means for retaining the end cap on the first end of the battery pack.

17. An enclosed battery pack comprising:
   a battery pack having opposite first and second ends and including at least one cell and a raised and exposed terminal carried at the first end for providing electrical contact with the at least one cell;
   a first end cap for capping the first end of the battery pack and including a raised terminal cover having a plurality of walls for enclosing the terminal so as to render it contactable by an outside element only by penetration of that element within the walls of the terminal cover; and
   means for surrounding the battery pack and overlappingly engaging the end cap so as to retain the end cap on the first end of the battery pack.

18. The enclosed battery pack of claim 17 wherein the first end cap includes a side wall for, in assembly, extending longitudinally over and closely fitting the first end of the battery pack and wherein the means for surrounding the battery pack comprises a band encircling the battery pack and said band provides the overlapping engagement of the end cap.

19. The enclosed battery pack of claim 18 and including a second end cap for capping the second end of the battery pack, said second end cap also including a side wall for, in assembly, extending longitudinally over and closely fitting the second end of the battery pack and wherein said band overlappingly engages the second end cap so as to retain it on the second end of the battery pack.

20. The enclosed battery pack of claim 17 wherein the first end cap is of unitary construction and formed from a single sheet of thin plastic material.

21. The enclosed battery pack of claim 17 wherein the terminal cover is closed and the walls of the cover include a severable portion and the cover is configured so that severance of the severable portion establishes a pre-defined opening in the walls for specific access to the terminal and so that the terminal remains substantially enclosed by the walls.

22. An enclosure for a battery pack, the pack having opposite first and second ends and including at least one cell and a projecting and exposed terminal carried at the first end for providing electrical contact with the at least one cell, comprising:
   a first end cap for capping the first end of the battery pack and including a wall transverse to said first end and a raised terminal cover extending from the transverse wall and integral with the cap, the terminal cover having a plurality of walls for enclosing the terminal so as to render it contactable by an outside element only by penetration of that element within the walls of the terminal cover; and
   means for surrounding the battery pack and overlappingly engaging the end cap so as to retain the end cap on the first end of the battery pack.

23. The enclosure of claim 22 and including a second end cap for capping the second end of the battery pack, said first and second end caps each including a side wall for, in assembly, extending longitudinally over and closely fitting the respective first and second ends of the battery pack and wherein the means for surrounding the battery pack comprises a band encircling the battery pack and said band overlappingly engages the first and second end caps so as to retain them on the respective first and second ends of the battery pack.

24. The enclosure of claim 22 wherein the first end cap is of unitary construction and formed from a single sheet of thin plastic material.

* * * * *